June 21, 1955    I. RIABOVOL    2,711,209

LOAD SUPPORTING MEANS OF ADJUSTABLE HEIGHT

Filed June 19, 1952

Inventor

Ivan Riabovol

United States Patent Office 2,711,209
Patented June 21, 1955

2,711,209

LOAD SUPPORTING MEANS OF ADJUSTABLE HEIGHT

Ivan Riabovol, Lyon, France

Application June 19, 1952, Serial No. 294,367

Claims priority, application France July 3, 1951

7 Claims. (Cl. 155—94)

The present invention relates to adjustable weight or load supporting devices such as a stool, the load supporting device being so arranged that its height is readily and smoothly adjustable and comprising manually operable releasing means which is held locked by the load and which is therefor incapable of being released while under load to suddenly drop the supported load.

The usual devices of this character may include locking means operated by an eccentric locking member which, if locked with insufficient locking force, will be insecure. Additionally, the usual locking devices permit a sudden release of the supported load to a lower height while the load is still supported by the supporting device.

In order to avoid these disadvantageous features, I have provided a novel load supporting device of adjustable height that offers the important advantage, in the case of a device supporting a seat, of permitting downward movement of the seat only when the seat is substantially free from any supported load, notwithstanding deliberate or inadvertent actuation of the releasing lever while the seat is under load.

Generally, the invention comprises two coaxial hollow tubes, freely slidably arranged one within the other to form a telescopic load supporting system capable of smooth and continuous adjustment. The lower end of the outer tube is fixed to a supporting base and the upper end of the inner tube carries a load engaging member such as a seat. The lower end of the inner tube is of frusto-conical shape and together with the adjacent portion of the inner surface of the outer tube defines a downwardly divergent or flaring annular space. A generally toroidal resiliently constrictively tensioned locking member is disposed within this annular space and is adapted to be expanded by the longitudinally directed compressive force produced by the weight of a supported load, this force being applied to the opposite ends of the hollow tubes. This compressive force is transmitted by the inner tube to its lower frusto-conical end portion, and the toroidal locking member expands and becomes forcibly wedged into the upper constricted portion of the downwardly divergent flaring annular space to lock the two coaxial tubes against any relative telescopic movement in response to the compressive force produced by the weight of the load.

This wedging locking action holds the toroidal locking member expanded and locked so long as any appreciable load is carried by the load engaging member. Additionally, a manually controllable locking member yieldingly urges the toroidal locking member into the upper constricted portion of the downwardly divergent flaring annular space so that preliminary locking action will be produced without load. To adjust the height of the supporting means, the controllable locking member is operated in the absence of any load, thereby permitting the toroidal locking member to contract upon the frusto-conical end portion of the inner tube and move downwardly out of its locking position in the constricted portion of the flaring annular space.

Various objects, features and advantages of the invention will become apparent upon reading the following specification together with the accompanying drawing forming a part hereof.

Referring to the drawing.

Figure 1:
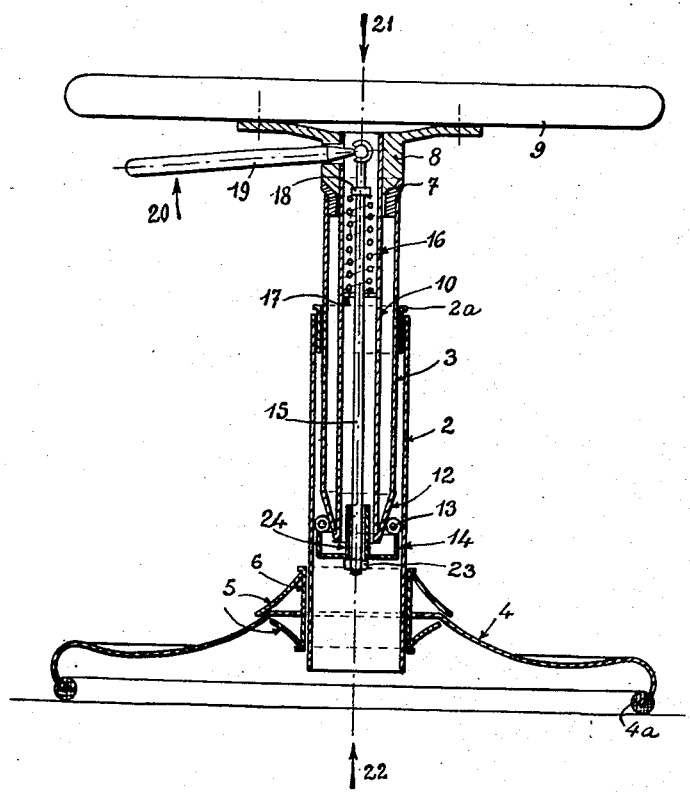
Figure 1 is a sectional view in elevation of an adjustable stool embodying the invention.

As shown in Fig. 1, the load supporting device comprises outer and inner telescopically arranged coaxial tubular members 2 and 3, respectively, both of circular cross-section, the inner member 3 being freely slidably disposed partially within the outer member 2. The outer tube 2 is connected to a circular base 4 of inverted dish shape, the cushioned annular bottom edge of the base 4a consisting of a continuous tube of rubber or other resilient material being shown resting on the floor. The base 4 is fixedly held between upper and lower annular members 5 which flare outwardly toward each other, the floor engaging base 4 being held between the larger diameter portions of the annular members 5. The annular members 5 are fixed to a sleeve 6 which is connected to and supports the lower end portion of the outer tube 2.

At its upper end, the inner tube 3 carries a frusto-conical thrust bearing 7 which in turn supports a cooperating bottom member 8 of a circular seat 9. The inter-engaging surfaces of thrust bearing 7 and seat bottom member 8 are slidably related enabling the circular seat 9 to be turned freely when not under load. A downwardly extending innermost tube 10 is fixed to the bottom member 8 of the seat 9 and is coaxially arranged with respect to the outer and inner tubes 2 and 3. The outer surface of the innermost tube 10 acts as a lateral bearing surface in connection with thrust bearing 7 and this innermost tube 10 extends down beyond the end of the inner tube 3.

Figure 2:
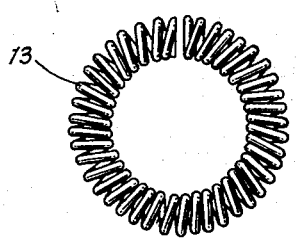
Figure 2 is an enlarged plan view of a constrictively tensioned toroidal locking member used in the adjustable stool shown in Fig. 1.

The lower end portion 12 of the inner tube 3 is of frusto-conical shape and together with the adjacent inner wall surface of the outer tube 2 defines a downwardly flaring annular space. Rollably disposed in this flaring annular space is a resiliently constrictively tensioned toroidal locking member which is shown in Fig. 2 as a helical tension spring 13. A controllable locking member in the form of a cup 14 yieldingly urges the toroidal locking member 13 upwardly into the convergent flaring annular space around the lower end 12 of the inner tube 3.

The cup 14 is connected to a vertical control rod 15. A helical compression spring 16 is disposed within the innermost tube 10. The lower end of compression spring 16 bears against a flange 17 formed on the inner surface of the innermost tube 10. The upper end of compression spring 16 bears against an annular shoulder 18 formed on the control rod 15, yieldingly urging the control rod 15 and the cup 14 upwardly, whereby the toroidal locking member 13 is normally pressed upwardly into its locking position in the convergent flaring annular space adjacent to the lower end portion 12 of inner tube 3. A flanged sleeve 2a is interposed between the inner tube 3 and the upper end of outer tube 2, the flange of the sleeve overlying the upper end of the latter tube.

The upper end of the control rod 15 is pivotally connected to the inner end of a releasing lever 19 having an outer free end portion disposed beneath the seat 9 and in proximity to the outer edge of seat 9 where it is conveniently accessible to be manually pressed upwardly whenever desired. The releasing lever 19 extends radially outwardly through an enlarged lateral opening formed in the seat bottom member 8, the upper and lower sides of this opening serving as a fulcrum located intermediate the ends of the releasing lever 19. By moving releasing lever 19 in a clockwise direction as indicated by the arrow 20, the control rod 15 may be moved downwardly against the action of compression spring 16, and cup 14 will move downwardly along with the control rod 15.

The greater the weight on seat 9, the greater will be the force tending to expand the toroidal locking spring 13 and wedge it forcefully into locking engagement between the tubes 2 and 3 to prevent relative telescopic movement of tubes 2 and 3 in response to a longitudinally directed compressive force in the direction of the arrows 21 and 22. This compressive force, which will be produced by the weight of a supported load, will hold the tubes 2 and 3 positively locked irrespective of the position of cup 14 and releasing lever 19. Thus, while a person is sitting on the seat 9, the seat 9 cannot be inadvertently lowered under load by manipulation of releasing lever 19.

The cup 14 is shown adjustably secured to the lower end of control rod 15 by a nut 23.

When the releasing lever 19 is moved in the direction of arrow 20 and the seat 9 is not under load, the cup 14 moves downwardly and permits the toroidal locking spring 13 to contract on the frusto-conical end portion 12 of the inner tube 3, thereby moving downwardly out of its locking position. The height of the seat 9 may then be adjusted as desired. Upon release of the releasing lever 19, compression spring 16 moves cup 14 upwardly and urges the toroidal locking spring 13 upwardly into locking position in the convergent flaring annular space. This produces a light preliminary locking action of the toroidal locking spring 13 which will be enhanced and augmented by any load applied to the seat 9, whereby the height of the seat 9 will remain fixedly locked while under load.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. Vertically adjustable load supporting means of the class described, comprising: a base; load engaging means disposed above said base; inner and outer coaxial telescopically arranged members of circular cross-section freely slidably disposed one at least partially within the other, said coaxial members extending vertically between said load engaging means and said base, the lower end portion of one of said members being connected to said base and the upper end portion of the other of said members being connected to said load engaging means, one end portion of said inner telescopic member being of frusto-conical shape and disposed within said outer member, said frusto-conical end portion and the adjacent inner surface of said outer member together defining a flaring annular space; a resiliently constrictively tensioned toroidal locking member rollably disposed in said flaring annular space and adapted to be expanded and wedged into the constricted portion thereof by a longitudinally directed compressive force applied to opposite end portions of said two coaxial members to lock said members against any relative telescopic movement responsive to said compressive force; and controllable locking means yieldingly urging said constrictively tensioned toroidal member into said constricted portion of said annular space.

2. Load supporting means according to claim 1, further comprising manually operable releasing means connected to move said controllable locking means and permitting, upon operation thereof, said constrictively tensioned toroidal member to contract upon said frusto-conical end portion of said inner tube in the absence of said compressive force and urge itself away from said constricted portion of said annular space, thereby releasing said telescopic members for relative movement with respect to each other.

3. Load supporting means according to claim 1, in which said toroidal locking member consists in its entirety of an annular helical tension spring.

4. Load supporting means according to claim 1, in which said base comprises a sleeve supporting the lower end portion of said member connected to said base, two annular members fixed to said sleeve and flaring outwardly toward each other, and a circular floor engaging member surrounding said sleeve and held between the larger diameter portions of said annular flaring members.

5. Vertically adjustable load supporting means of the class described, comprising: a base; load engaging means disposed above said base; inner and outer coaxial telescopically arranged members of circular cross-section freely slidably disposed one at least partially within the other, said coaxial members extending vertically between said load engaging means and said base, the lower end portion of said outer member being connected to said base and the upper end portion of said inner member being connected to said load engaging means by means including thrust bearing means, the lower end portion of said inner telescopic member being of frusto-conical shape and disposed within said outer member, said frusto-conical end portion of said inner member and the adjacent inner surface of said outer member together defining a flaring annular space; a resiliently constrictively tensioned toroidal locking member rollably disposed in said flaring annular space and adapted to be expanded and wedged into the constricted portion thereof by a longitudinally directed compressive force applied to opposite end portions of said two coaxial members to lock said members against any relative telescopic movement responsive to said compressive force; and manually operable locking means yieldingly urging said constrictively tensioned rollable toroidal member into said constricted portion of said annular space to lock said tubes against any relative telescopic movement responsive to said compressive force.

6. Load supporting means according to claim 5, wherein said thrust bearing means comprises two members having interengaging frusto-conical friction surfaces enabling free rotation of said load supporting means when not under load, said friction surfaces being coaxial with said telescopic members.

7. Load supporting means according to claim 5, in which said toroidal locking member consists in its entirety of an annular helical tension spring.

References Cited in the file of this patent

UNITED STATES PATENTS

| | | |
|---|---|---|
| 1,048,143 | Franke | Dec. 24, 1912 |
| 1,988,037 | Furrer | Jan. 15, 1935 |
| 2,469,896 | Schaef | May 10, 1949 |
| 2,547,455 | Freeman | Apr. 3, 1951 |

FOREIGN PATENTS

| | | |
|---|---|---|
| 320,388 | France | Aug. 18, 1902 |
| 596,745 | Great Britain | Jan. 9, 1948 |